(12) United States Patent
Venkataraman et al.

(10) Patent No.: US 11,528,679 B2
(45) Date of Patent: Dec. 13, 2022

(54) 5G NEW RADIO DE-REGISTRATION PROCEDURES

(71) Applicant: Apple Inc., Cupertino, CA (US)

(72) Inventors: Vijay Venkataraman, San Jose, CA (US); Krisztian Kiss, Hayward, CA (US); Lakshmi N. Kavuri, Cupertino, CA (US); Sang Ho Baek, Palo Alto, CA (US); Shivani Suresh Babu, San Jose, CA (US); Utkarsh Kumar, Fremont, CA (US); Viswanath Nagarajan, San Jose, CA (US); Yifan Zhu, San Jose, CA (US); Hariharan Sukumar, San Diego, CA (US)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 17/164,439

(22) Filed: Feb. 1, 2021

(65) Prior Publication Data
US 2021/0160809 A1    May 27, 2021

Related U.S. Application Data

(63) Continuation of application No. 16/430,492, filed on Jun. 4, 2019, now Pat. No. 10,912,054.

(60) Provisional application No. 62/692,418, filed on Jun. 29, 2018.

(51) Int. Cl.
| | |
|---|---|
| *H04W 60/06* | (2009.01) |
| *H04W 76/34* | (2018.01) |
| *H04W 88/06* | (2009.01) |
| *H04W 36/00* | (2009.01) |
| *H04W 8/26* | (2009.01) |

(52) U.S. Cl.
CPC ....... *H04W 60/06* (2013.01); *H04W 36/0022* (2013.01); *H04W 76/34* (2018.02); *H04W 88/06* (2013.01); *H04W 8/26* (2013.01)

(58) Field of Classification Search
CPC . H04W 60/06; H04W 36/0022; H04W 76/34; H04W 76/16; H04W 88/06; H04W 8/26
See application file for complete search history.

(56) References Cited

U.S. PATENT DOCUMENTS

| | | | |
|---|---|---|---|
| 7,865,204 B1 | 1/2011 | Shusterman | |
| 2013/0023275 A1 | 1/2013 | Mutya | |
| 2013/0150031 A1* | 6/2013 | Hedman | .............. H04W 8/06 455/433 |
| 2013/0172023 A1 | 7/2013 | Chan | |
| 2013/0201850 A1 | 8/2013 | Swaminathan | |
| (Continued) | | | |

FOREIGN PATENT DOCUMENTS

JP    2019125842 A  *  7/2019  ............ H04W 16/32

*Primary Examiner* — Farid Seyedvosoghi
(74) *Attorney, Agent, or Firm* — Kowert, Hood, Munyon, Rankin & Goetzel, P.C.

(57) ABSTRACT

Apparatuses, systems, and methods for a wireless device to perform methods for de-registration of the wireless device from a first access type over a second access type. Methods also include procedures for maintaining state machines associated with both access types as well as procedures to determine a connection for re-transmitting a de-registration request and to avoid collisions between procedures associated with the first and second access types. Further, methods include an information element configured to indicate which access type has been de-registered.

20 Claims, 15 Drawing Sheets

(56) References Cited

U.S. PATENT DOCUMENTS

2014/0206346 A1\* 7/2014 Kiukkonen ........... H04W 12/50
          455/426.1
2018/0376445 A1   12/2018 Yoon et al.
2019/0357037 A1   11/2019 Velev et al.
2021/0153286 A1\*  5/2021 Park ..................... H04W 76/22

\* cited by examiner

| Bit 2 Value | Bit 1 Value | Access type |
|---|---|---|
| 0 | 1 | 3GPP access |
| 1 | 0 | Non-3GPP access |
| 1 | 1 | 3GPP and non-3GPP access |
| All other values are reserved | | |

| De-registration Request Access Type Possible Values | De-registration Accept Access Type Possible Values |
|---|---|
| 3GPP | - 3GPP<br>- 3GPP and non-3GPP (if and only if there is a pending de-registration request being processed for non-3GPP 5GMM) |
| Non-3GPP | - Non-3GPP<br>- 3GPP and non-3GPP (if and only if there is a pending de-registration request being processed for 3GPP 5GMM) |
| 3GPP and non-3GPP | - 3GPP<br>- Non-3GPP<br>- 3GPP and non-3GPP |

*FIG. 10*

5G NEW RADIO DE-REGISTRATION PROCEDURES

PRIORITY DATA

This application is a continuation of U.S. patent application Ser. No. 16/430,492, titled "5G New Radio De-Registration Procedures", filed Jun. 4, 2019, and which claims benefit of priority to U.S. Provisional Application Ser. No. 62/692,418, titled "5G New Radio De-Registration Procedures", filed Jun. 29, 2018, each of which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless devices, and more particularly to apparatus, systems, and methods for de-registration procedures for a wireless device in a fifth generation (5G) New Radio (NR) network.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from media access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of the less restrictive UE scheduling in order to further leverage power savings opportunities.

SUMMARY

Embodiments relate to apparatuses, systems, and methods for de-registration procedures for a wireless device in a fifth generation (5G) New Radio (NR) network.

In some embodiments, a user equipment device (UE) may be configured to perform methods for de-registration of the UE from a first access type over a second access type. Methods also include procedures for maintaining state machines associated with both access types as well as procedures to determine a connection for re-transmitting a de-registration request and to avoid collisions between procedures associated with the first and second access types. Further, methods include an information element configured to indicate which access type has been de-registered.

In some embodiments, a network entity or functional entity comprised within the network entity and or within the UE may be configured to perform methods for de-registration of the UE from a first access type over a second access type. Methods also include procedures for maintaining state machines associated with both access types as well as procedures to determine a connection for re-transmitting a de-registration request and to avoid collisions between procedures associated with the first and second access types. Further, methods include an information element configured to indicate which access type has been de-registered.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 10 illustrates a summary of usage of the de-registration accept type information element, according to some embodiments.

Figure 1A:
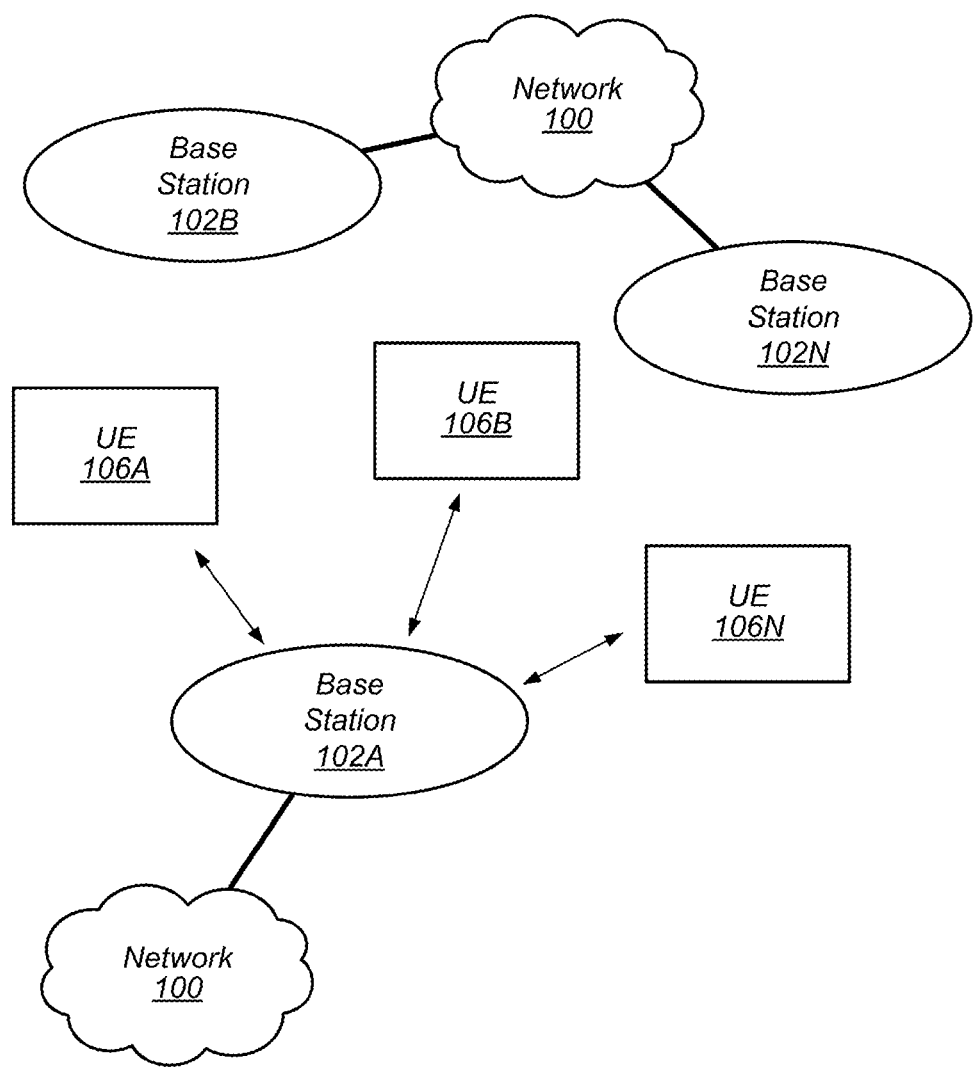
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
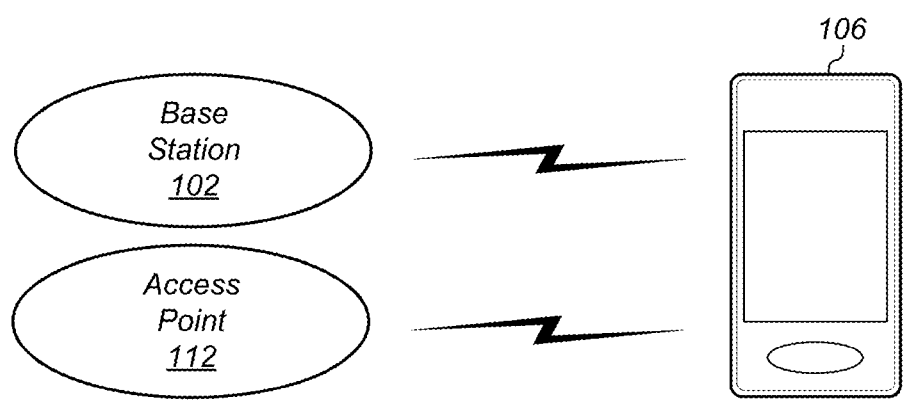
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 2:
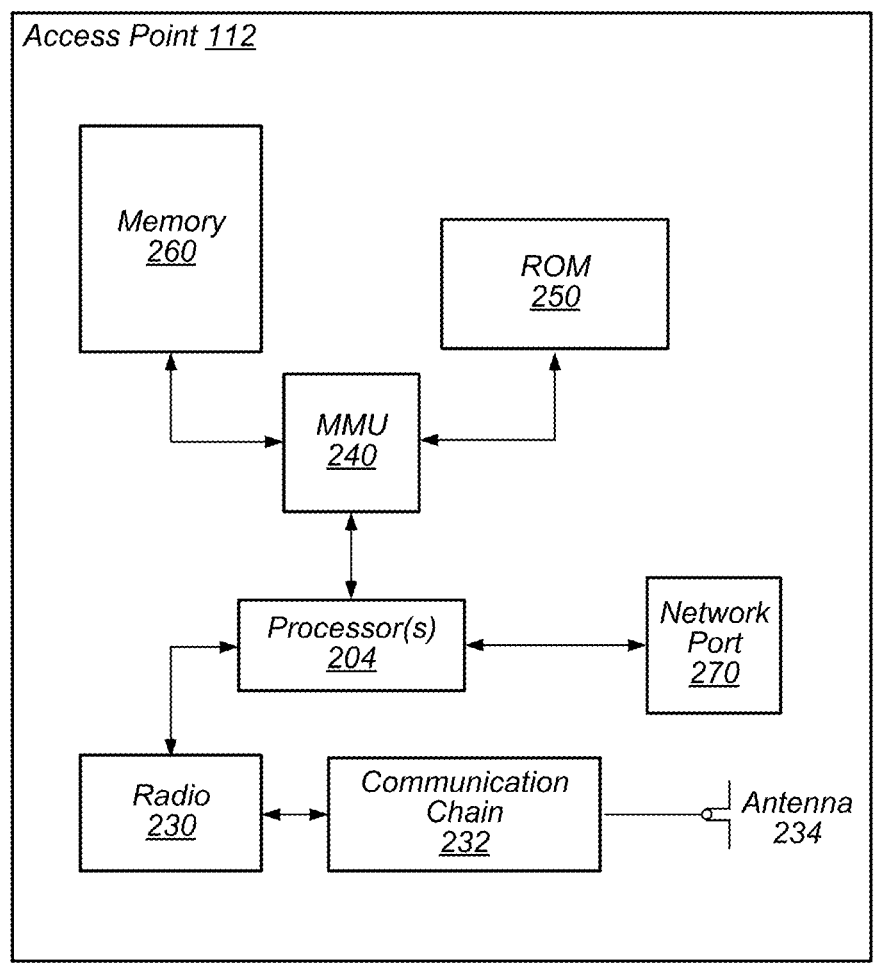
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to establish, with a peer wireless device, a peer-to-peer data communication session (e.g., a paged data link), where the AP 112 and the peer wireless device are associated with a data cluster. The AP 112 may be configured to determine that the AP 112 has one or more pending data frames to transmit for the paged data link and transmit, outside a scheduled paging window associated with the paged data link, a beacon to the peer wireless station. In some embodiments, the beacon may include a paging attribute indicating the pending data frames. In some embodiments, devices within the data cluster may have scheduled periodic common resource blocks (CRBs) and the beacon may be transmitted in the common CRBs. In some embodiments, the beacon may be transmitted in a discovery window. In some embodiments, the beacon may be a discovery beacon or a synchronization beacon.

In some embodiments, as further described below, an AP 112 may be configured to perform methods to improve de-registration procedures as further described herein.

Figure 3:
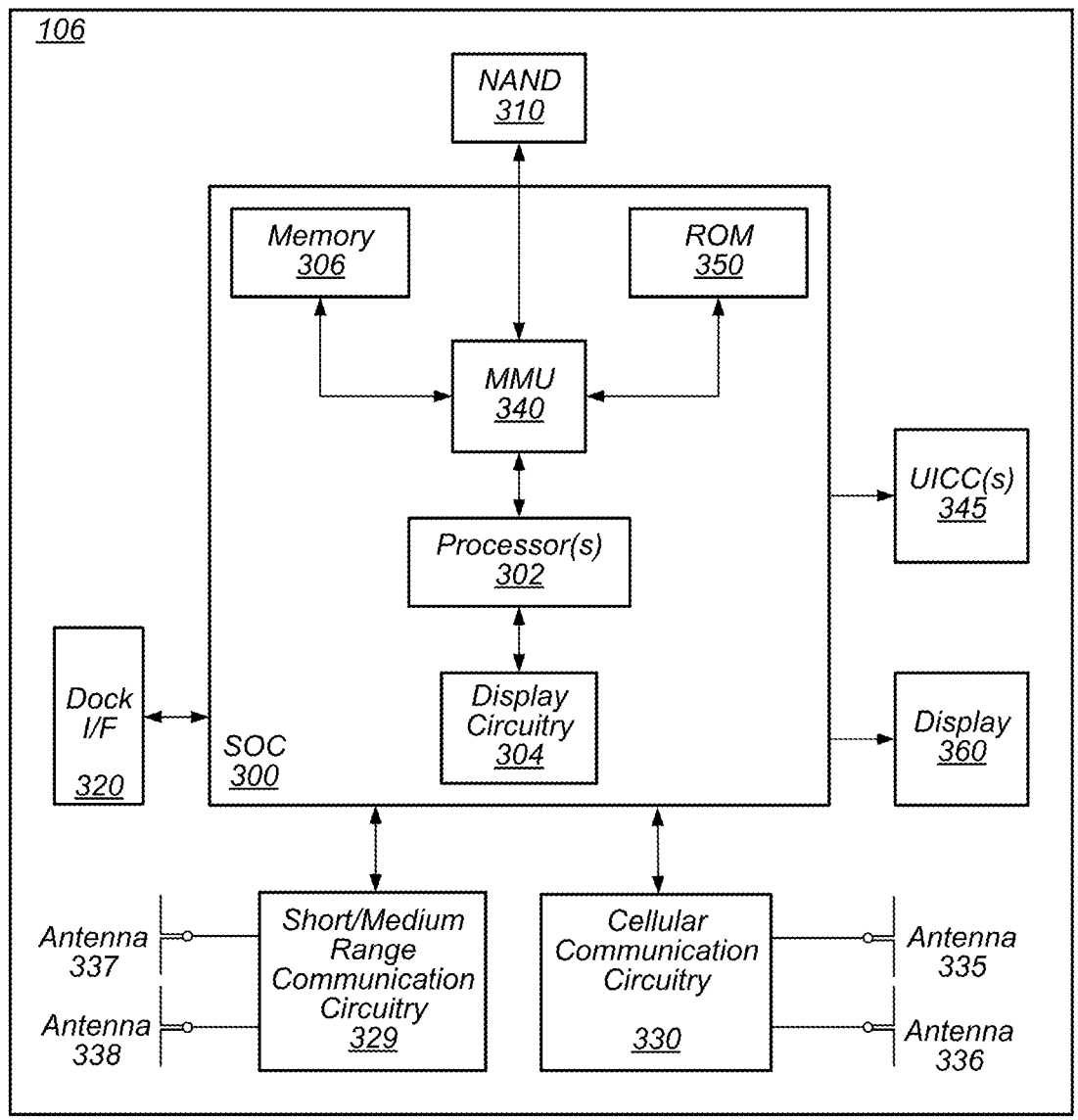
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods to improve de-registration procedures as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short-range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short-range wireless communication circuitry 329 may include one or more ICs that are configured to perform the functions of short-range wireless communication circuitry 32. In addition, each integrated circuit may include circuitry (e.g., first circuitry, second circuitry, etc.) configured to perform the functions of short-range wireless communication circuitry 329.

Figure 4:
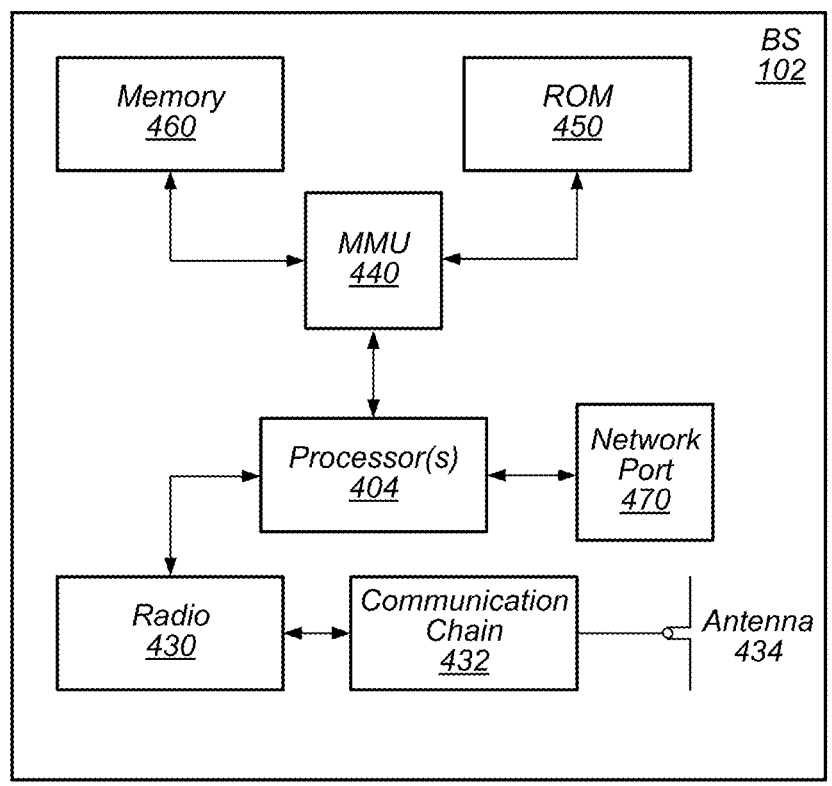
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
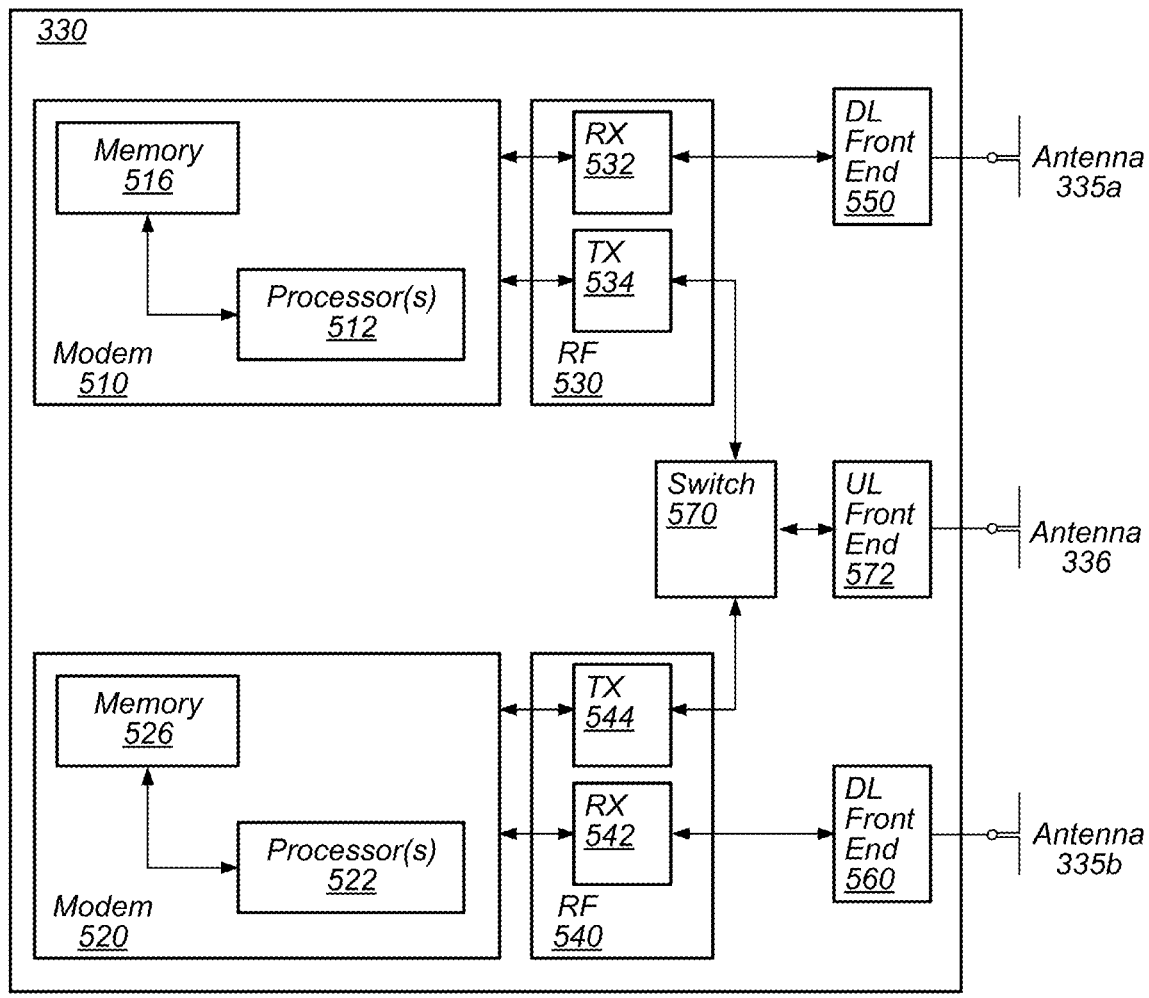
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods to improve de-registration procedures as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
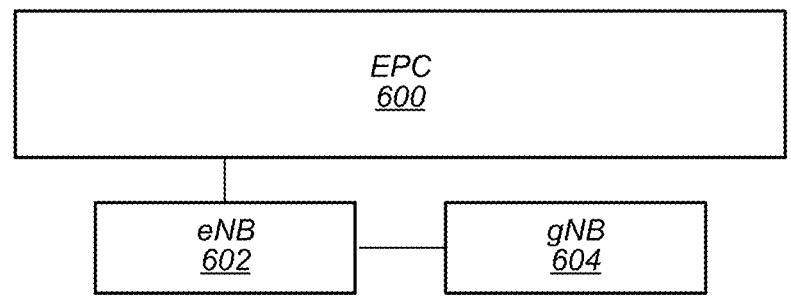
FIG. 6A illustrates an example of connections between an EPC network, an LTE base station (eNB), and a 5G NR base station (gNB).
Figure 6B:
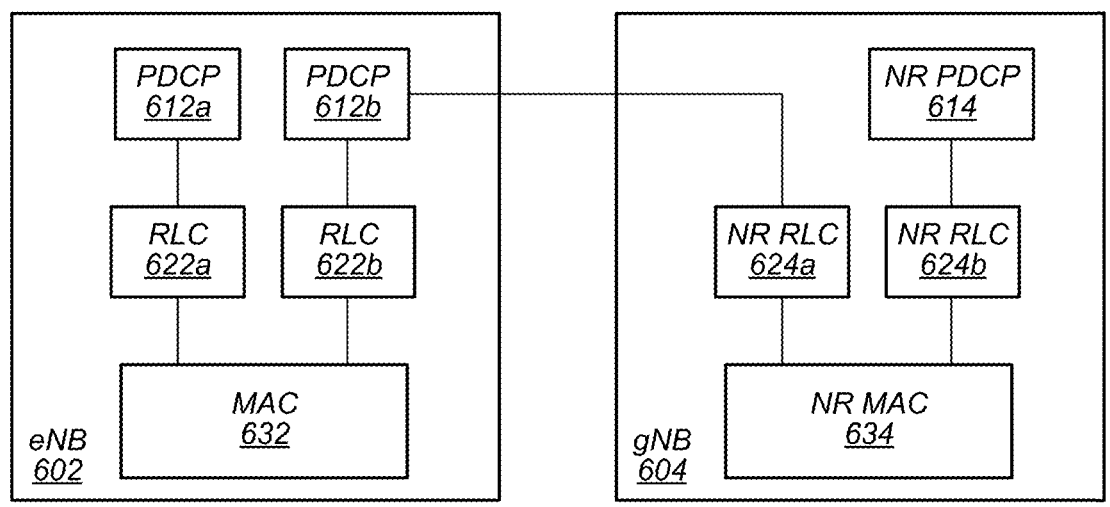
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking With Wi-Fi

Figure 7:
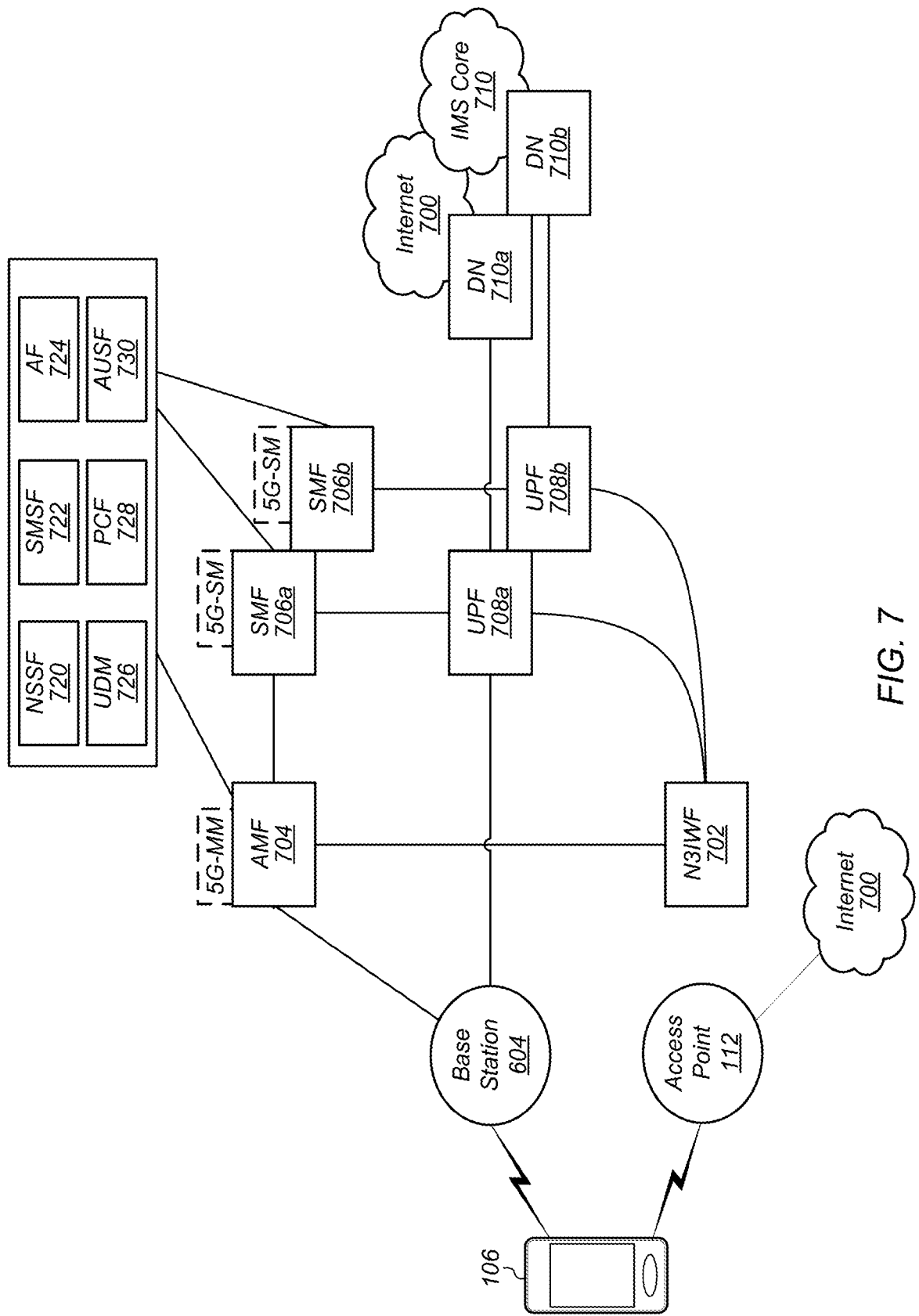
FIG. 7 illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7 illustrates an example of a 5G network architecture that incorporates both 3GPP (e.g., cellular) and non-3GPP (e.g., non-cellular) access to the 5G CN, according to some embodiments.

As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods for enhanced 5G de-registration procedures, e.g., as further described herein.

Figure 8:
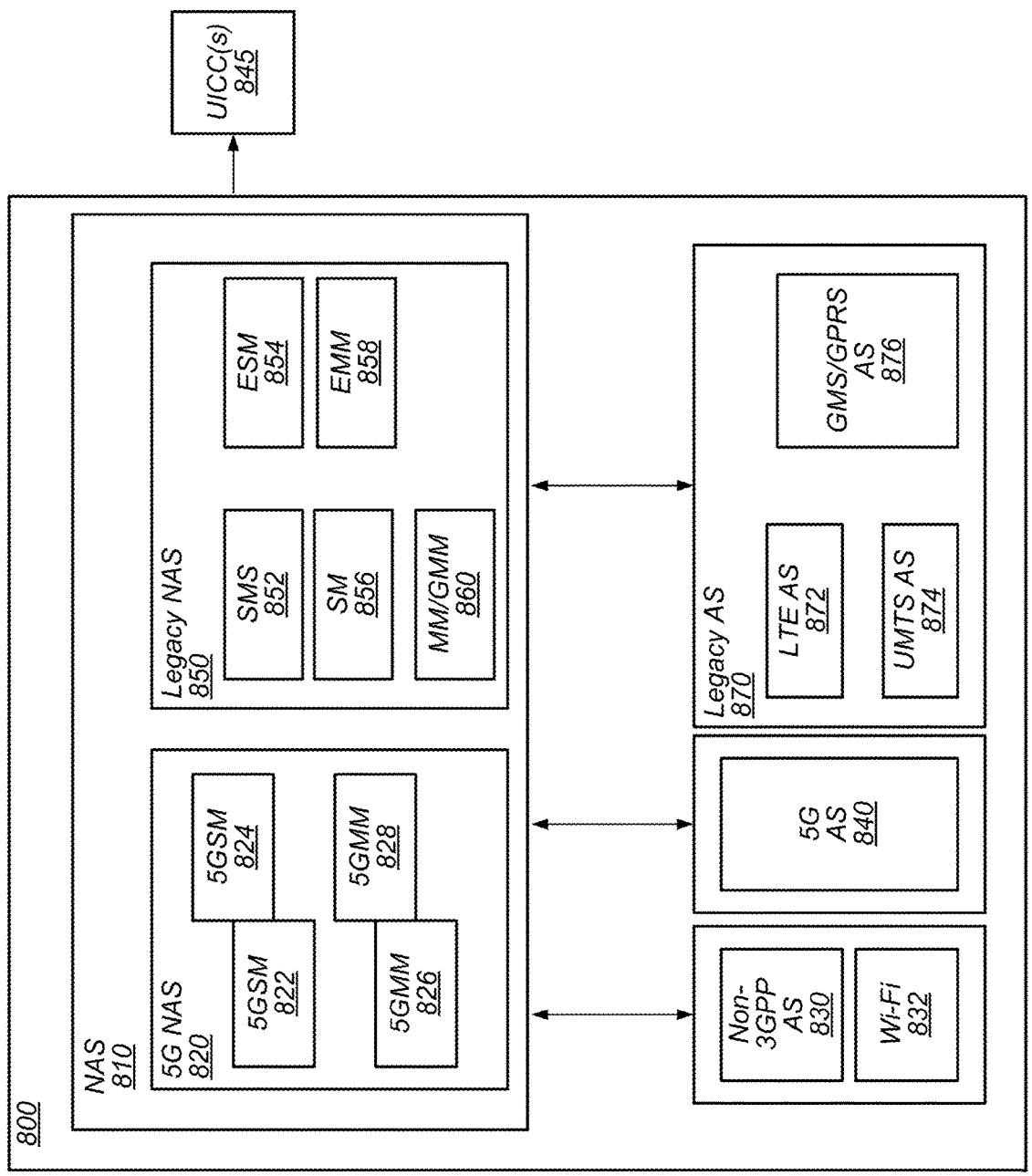
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods for enhanced 5G de-registration procedures, e.g., as further described herein.

5G De-Registration Procedure Enhancements

In some existing implementations, a device may register to a single public land mobile network (PLMN) (e.g., a common 5G core network) via both cellular (e.g., 3GPP defined protocol) access and non-cellular (e.g., non-3GPP defined protocol) access. Once registered, a device may initiate a de-registration procedure when certain events (e.g., switch-off (powering down), airplane mode enablement, UICC removal, UICC credential change/update/etc., 5G disabled for both accesses, and so forth). Note that de-registration may be required for both access types responsive to the certain events. Thus, according to 3GPP TS 24.501 Release 15, a device may de-register from both accesses with a single de-registration message. In addition, an access type information element (IE) is included in the de-registration request message. Note that according to 3GPP TS 24.501 Release 15, FIG. 5.5.2.2.1.1 a timer T3521 is initiated when the de-registration request is sent and stopped when a de-registration accept message is received. Note additionally, that there may be scenarios in which the UE may attempt to de-register for access type "A" over access type "B". For example, a UE may be leaving (or losing) Wi-Fi coverage and the UE may initiate de-registration of the Wi-Fi access (e.g., non-3GPP access) 5G MM over a cellular (e.g., 3GPP access) connection.

3GPP TS 24.501 Release 15, Section 5.5.2.2.1 further states that "[t]he de-registration procedure is initiated by the UE by sending a DEREGISTRATION REQUEST message . . . [t]he De-registration type IE included in the message indicates whether the de-registration procedure is due to a 'switch off' or not." In addition, the message includes an access type to indicate "whether the de-registration procedure is:

a) for 5GS services over 3GPP access when the UE is registered over 3GPP access only;

b) for 5GS services over non-3GPP access when the UE is registered over non-3GPP access only; or c) for 5GS services over 3GPP access, non-3GPP access or both 3GPP access and non-3GPP access when the UE is registered in the same PLMN over both accesses."

Further, "[i]f the de-registration request is not due to switch off and the UE is in the state 5GMM-REGISTERED or 5GMM-REGISTERED-INITIATED, timer T3521 shall be started in the UE after the DEREGISTRATION REQUEST message has been sent." Thus, "[t]he UE shall enter the state 5GMM-DEREGISTERED-INITIATED." These state transitions are defined by FIG. 5.1.3.2.1.1.1 of 3GPP TS 24.501 Release 15. In addition to specifying UE behavior, 3GPP TS 24.501 section 5.5.2.3.1 specifies network behavior for a de-registration process. For example, "[t]he network shall also indicate via the access type whether the de-registration procedure is for 3GPP access, or for both 3GPP access and non-3GPP access when the UE is registered in the same PLMN for both accesses."

Thus, to summarize de-registration procedures as specified in 3GPP TS 24.501 Release 15, a 5G NAS MM (5G MM) may initiate de-registration in the following ways:

(1) Deregistration for 3GPP 5G MM over 3GPP access;

(2) Deregistration for non-3GPP 5G MM over non-3GPP access;

(3) Deregistration for non-3GPP 5G MM over 3GPP access;

(4) Deregistration for 3GPP 5G MM over non-3GPP access;

(5) Deregistration for non-3GPP as well as 3GPP accesses over 3GPP access; or (6) Deregistration for non-3GPP as well as 3GPP accesses over non-3GPP access.

As specified by FIG. 5.1.3.2.1.1.1 of 3GPP TS 24.501 Release 15, the UE may enter a 5GMM-De-Registered-Initiated state when a de-registration procedure is initiated. Then, upon successful completion of the de-registration procedure, the UE may enter a 5GMM-De-registered state. Note that a UE may initiate a service request for any pending uplink data, or for an incoming page, only when the 5G MM state is 5GMM-Registered.

However, when a UE attempts to send de-registration request for 5G MM access type "A" (e.g., 3GPP) over physical access type "B" (e.g., non-3GPP), it is not clear in the 3GPP specification which 5G MM state machine would transition to 5GMM-DEREGISTERED-INITIATED. Thus, embodiments described herein include methods for state machine handling when (1) de-registration request for non-3GPP 5G MM is transmitted over 3GPP access; (2) de-registration request for 3GPP 5G MM is transmitted over non-3GPP access; (3) de-registration request for non-3GPP 5G MM as well as 3GPP 5g MM is transmitted over 3GPP access; and (4) de-registration for non-3GPP 5G MM as well as 3GPP 5G MM is transmitted over non-3GPP access.

In some embodiments, the 5G MM which initiated the de-registration request may transition (or move) to 5GMM-DEREGISTRATION-INITIATED state. For example, if a non-3GPP 5G MM initiated a de-registration request that was transmitted over a 3GPP or a non-3GPP access, then the non-3GPP 5G MM may transition to the 5GMM-DEREGISTRATION-INITIATED STATE while the 3GPP 5G MM may retain its existing state. As another example, if a 3GPP 5G MM initiated a de-registration request that was transmitted over a 3GPP or a non-3GPP access, then 3GPP 5G MM may transition to the 5GMM-DEREGISTRATION- INITIATED STATE while the non-3GPP 5G MM may retain its existing state. As a further example, if a de-registration request was initiated for both 3GPP 5G MM as well as non-3GPP 5G MM at approximately the same time, both the 5G MMs may transition to the 5GMM-DEREGISTRATION-INITIATED state.

Alternatively, in some embodiments, a 5G MM corresponding to the access over which a de-registration request is being transmitted may transition to a 5GMMDEREGISTRATION-INITIATED state and may internally remember (e.g., via an entry in a data structure) the "access type" included in the de-registration request. In such embodiments, any service request initiated for the "other" access type may be honored. For example, if a de-registration procedure is initiated for non-3GPP 5G MM over 3GPP access, 3GPP 5G MM may transition to a DEREGISTRATION-INITIATED STATE and the non-3GPP 5G MM may also transition to DEREGISTRATION-INITIATED STATE. However, any Service request (e.g., due to a data and/or signaling) initiated for 3GPP 5G MM may be honored by the UE (e.g., based on the entry in the data structure indicating which access type was de-registered).

Alternatively, in some embodiments, a 5G MM corresponding to the access over which a de-registration request is being transmitted may transition to an 5GMM-DEREGISTRATION-INITIATED-FOR-OTHER-ACCESS state. Such a state may allow for any data and/or signaling. For example, if a de-registration procedure is initiated for non-3GPP 5G MM over 3GPP access, 3GPP 5G MM may transition to a DEREGISTRATION-INITIATED-FOR-OTHER-ACCESS STATE and the non-3GPP 5G MM may transition to DEREGISTRATION-INITIATED STATE. Note that in some embodiments, any service request (e.g., due to a data and/or signaling) initiated for 3GPP 5G MM may be honored by the UE in DEREGISTRATION-INITIATED-FOR-OTHER-ACCESS STATE.

In some scenarios, a UE may initiate de-registration requests for both access types. For example, a UE may initiate a de-registration request for a non-3GPP 5G MM over 3GPP access and prior to receiving a de-registration acceptance message, the UE may initiate a de-registration request for a 3GPP 5G MM over the 3GPP access. In response, and according to 3GPP TS 24.501 Release 15 Section 5.5.2.2.2, "the AMF shall send a DEREGISTRATION ACCEPT message to the UE, if the de-registration type IE does not indicate 'switch off'." In addition, Section 5.5.2.2.2 states that "the procedure is completed when the AMF receives the DEREGISTRATION REQUEST message" if the IE does indicate "switch off". Further, Section 5.5.2.2.2 instructs that "[t]he UE, when receiving the DEREGISTRATION ACCEPT message, shall stop timer T3521." Hence, according to the standard, an AMF may transmit a de-registration accept message for either or both of the 3GPP 5G MM or the non-3GPP 5G MM. However, upon receipt of the de-registration accept message, the 3GPP 5G MM may not know whether the message is for the 3GPP or non-3GPP de-registration procedure. Thus, the UE may not know which 5G MM to transition to a DEREGISTERED state.

Figures 9A, 9B:
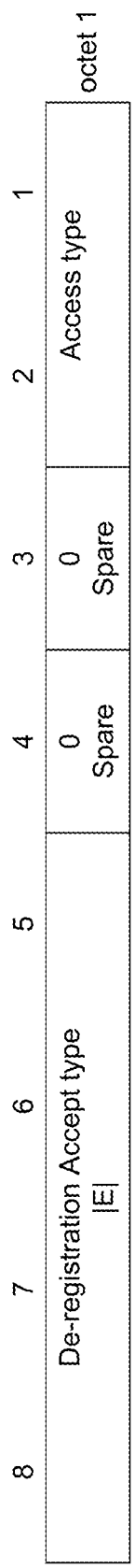
FIGS. 9A-B illustrate an example of a de-registration accept type attribute (or information element), according to some embodiments.

In some embodiments, a de-registration accept type attribute may be included in a de-registration accept message. In some embodiments, as illustrated by FIG. 9A, the de-registration accept type attribute (or information element) may be a type 1 information element (IE) and may include 8 bits with bits 1 and 2 identifying an access type. For example, a value of "00000001" may indicate 3GPP access, a value of "00000010" may indicate non-3GPP access, and a value of "00000011" may indicate 3GPP access and non-3GPP access. In other words, as illustrated by FIG. 9B, a de-registration accept type information element with a value of bits 2 and 1 of "01" may indicate 3GPP access. Similarly, a de-registration accept type information element with a value of bits 2 and 1 of "10" may indicate non-3GPP access. Further, a de-registration accept type information element with a value of bits 2 and 1 of "11" may indicate 3GPP access and non-3GPP access. In addition, the de-registration accept type IE may be considered mandatory for a deregistration accept message. Further, in some embodiments, the standardized "de-registration type" IE may be renamed as "de-registration request type" IE.

In some embodiments, for example, a UE (such as UE 106) may initiate a de-registration request for a non-3GPP 5G MM over a 3GPP access and before receiving de-registration accept message from an AMF, the UE initiates a de-registration request for a 3GPP 5G MM over 3GPP Access. In such an instance, the AMF may determine to transmit any of (1) a de-registration accept message including a de-registration accept type IE indicating "non-3GPP access" thereby completing de-registration for the non-3GPP access; (2) a de-registration accept message including a de-registration accept type IE indicating "3GPP access" thereby completing de-registration for the 3GPP access; or (3) a de-registration accept message including a de-registration accept type IE indicating "3GPP access and non-3GPP access" thereby completing de-registration for both the 3GPP access and the non-3GPP access (e.g., assuming both de-registration requests have been received from the UE).

As another example, in some embodiments, when a UE and/or an AMF has requested de-registration for both 3GPP and non-3GPP 5G MMs, the AMF and/or UE may send de-registration accept messages for each 5G MM individually and in any order. FIG. 10 summarizes usage of the de-registration accept type IE, according to some embodiments. As shown, when a value of a de-registration accept type IE included in a de-registration request message indicates "3GPP", a value of a de-registration accept type IE included in a de-registration accept message may indicate "3GPP" or "3GPP and non-3GPP" (e.g., if, and only if, there is a pending de-registration request being processed for a non-3GPP 5G MM). Further, when a value of a de-registration accept type IE included in a de-registration request message indicates "non-3GPP", a value of a de-registration accept type IE included in a de-registration accept message may indicate "non-3GPP" or "3GPP and non-3GPP" (e.g., if, and only if, there is a pending de-registration request being processed for a 3GPP 5G MM). Additionally, when a value of a de-registration accept type IE included in a de-registration request message indicates "3GPP and non-3GPP", a value of a de-registration accept type IE included in a de-registration accept message may indicate "3GPP", "non-3GPP" or "3GPP and non-3GPP".

In some implementations, tracking of NAS counts may be compromised when a de-registration request for an access type "A" is transmitted over an access type "B". For example, according to 3GPP TS 33.501 Release 15 Section 6.3.2.2, "[w]hen the UE is registered in a serving network over two types of access (e.g. 3GPP and non-3GPP), then the UE has two active NAS connections with the same AMF." Further, since "[a] common 5G NAS security context is created during the registration procedure over the first access type" and "[i]n order to realize cryptographic separation and replay protection, the common NAS security-context shall have parameters specific to each NAS connection." As specified, "connection specific parameters include a pair of NAS COUNTS for uplink and downlink and unique NAS connection identifier" and a "value of the unique NAS connection identifier shall be set to '0' for 3GPP access and set to '1' for non-3GPP access." Additionally, according to 3GPP TS 24.501 Release 15 Section 4.4.3, "[e]ach 5G NAS security context shall be associated with two separate counters NAS COUNT per access type in the same PLMN." A first NAS COUNT is "related to uplink NAS messages" and a second NAS COUNT is "related to downlink NAS messages." In addition, "[i]f the 5G NAS security context is used for access via both 3GPP and non-3GPP access in the same PLMN, there are two NAS COUNT counter pairs associated with the 5G NAS security context." Thus, it is unclear from the specifications on which NAS COUNTs to be used for scenarios where de-registration for an access type "A" is transmitted over an access type "B".

In some embodiments, when a de-registration request for an access type "A" is transmitted over access type "B", a UE/AMF/NW may continue to use a NAS COUNT and a NAS connection identifier (ID) corresponding to access type B. In other words, the UE/AMF/NW may continue to use a NAS COUNT and a NAS connection ID associated with the 5G MM used for transmission of the de-registration request.

In some implementations (e.g., according to 3GPP TS 24.501 Release 15 Section 5.5.2.2.6), a device/network may decide on which access type a de-registration request may be re-transmitted. In such instances, a UE may re-transmit de-registration requests on a different access type than a previous attempt, e.g., upon one of the first four expirations of a T3521 timer.

Figure 11:
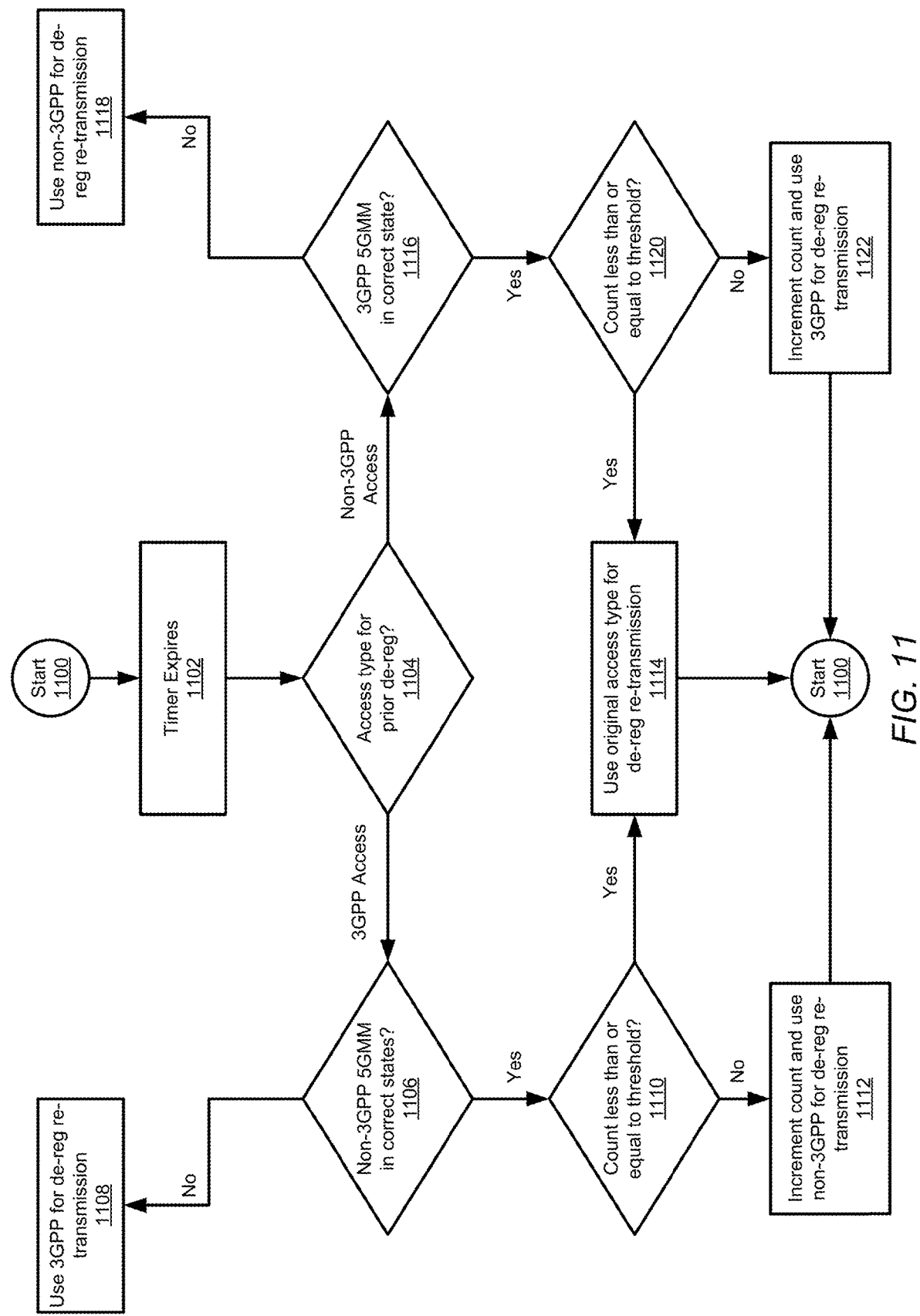
FIG. 11 illustrates a flow diagram for determining which access type to re-transmit a de-registration request, according to some embodiments.

FIG. 11 illustrates a flow diagram for determining which access type to re-transmit a de-registration request, according to some embodiments. The flow diagram shown in FIG. 11 may be used in conjunction with any of the systems or devices shown in the above Figures, among other devices. In various embodiments, some of the elements shown may be performed concurrently, in a different order than shown, or may be omitted. Additional elements may also be performed as desired. As shown, the flow diagram may operate as follows.

At 1100, a counter (e.g., countdereg_access_flip) may be initialized to a value of "0" upon initiation of a de-registration procedure. Additionally, a threshold associated with the counter may be configured. In some embodiments, the value of the threshold may be set to 2, however, other values are contemplated. Upon expiration of a T3521 time at 1102, the flow diagram may determine an access type used for a prior de-registration attempt at 1104. If 3GPP access was used, the flow diagram may continue to determine whether a non-3GPP 5G MM is in a REGISTERED state and/or a CM-Connected state at 1106. If the non-3GPP 5G MM is not in one of these states, the flow diagram may determine to use 3GPP access for a de-registration re-transmission at 1108. Alternatively, if the non-3GPP 5G MM is in one of the states, the counter may be compared to the threshold at 1110. If the counter is greater than or equal to the threshold, the flow diagram may determine to use an original access type (e.g., access type used of initial de-registration request) for the de-registration retransmission at 1114 and the flow diagram may return to 1100. However, if the counter is less than the threshold, the counter may be incremented and non-3GPP access type may be used for the de-registration re-transmission attempt at 1112 and the flow diagram may return to 1100.

Alternatively, if non-3GPP access was used, the flow diagram may continue to determine whether a 3GPP 5G MM is in a REGISTERED state at 1116. If the 3GPP 5G MM is not in the REGISTERED state, the flow diagram may determine to use non-3GPP access for a de-registration re-transmission at 1118. Alternatively, if the 3GPP 5G MM is in the REGISTERED state, the counter may be compared to the threshold at 1120. If the counter is greater than or equal to the threshold, the flow diagram may determine to use an original access type (e.g., access type used of initial de-registration request) for the de-registration re-transmission at 1114 and the flow diagram may return to 1100. However, if the counter is less than the threshold, the counter may be incremented and 3GPP access type may be used for the de-registration re-transmission attempt at 1122 and the flow diagram may return to 1100.

In some scenarios, a UE may be registered over a non-3GPP access and may initiated registration for 3GPP access. In such instances, as soon as registration for the 3GPP access is complete, the UE may initiate a de-registration procedure for the non-3GPP access. However, according to 3GPP TS 24.501 Release 15 Section 5.5.1.2.4, the AMF may not immediately release the 3GPP connection if the UE has indicated "follow-on request pending" or if the network has pending downlink signaling. Thus, some embodiments, a UE (e.g., UE 106) may take advantage of the option of deregistering a non-3GPP access over a 3GPP access. Additionally, since a registration for the 3GPP access may be ongoing, the UE may use the same NAS signaling connection in order to send the de-registration request for non-3GPP over 3GPP access by indicating "follow-on request pending" in a registration request message. In some embodiments, the UE may use information from a 5G MM of the non-3GPP access and make a decision on indicating "follow-on request pending" in the registration request message based on the information from the 5G MM of the non-3GPP access.

In some scenarios, a UE may be registered over a non-3GPP access with some PDN sessions and may initiate registration for 3GPP access. In such instances, as soon as registration for the 3GPP access is complete, the UE may move some (or) all PDN connections from non-3GPP to 3GPP access. However, according to 3GPP TS 24.501 Release 15 Section 5.5.1.2.4, the AMF may not immediately release the 3GPP connection if the UE has indicated "follow-on request pending" or if the network has pending downlink signaling. Since a registration for the 3GPP access may be ongoing, the UE may use the same NAS signaling connection in order to transfer the PDN sessions from non-3GPP to 3GPP access by indicating "follow-on request pending" in a registration request message. In some embodiments, the UE may use information from a 5G MM of the non-3GPP access and make a decision on indicating "follow-on request pending" in the registration request message based on the information from the 5G MM of the non-3GPP access.

In various implementations of the current standard, there may be instances (or scenarios) in which a procedure initiated by a UE/network "collides" with a de-registration procedure initiated by the network/UE. For example, in some implementations, a UE and a network may both initiate de-registration procedures. As another example, there may be a "collision" during a network initiated de-registration procedure and a UE registration procedure. Further, in some implementations, there may be a "collision" during a network initiated de-registration procedure and a UE initiated service request. Similarly, in some implementations, there may be a "collision" during a network initiated registration procedure and a UE initiated de-registration procedure. Additionally, in some implementations, there may be a "collision" during a security mode control procedure and a UE initiated de-registration procedure. In addition, in some implementations, there may be a "collision" during a de-registration procedure for one access type when a second access type is supporting an emergency services session.

In each of the above described instances, it is unclear how the network and/or UE should proceed with the access types for the various procedures are not aligned. In other words, the standard is ambiguous in scenarios when a first procedure is initiated (and/or ongoing) for a first access type (e.g., 3GPP or non-3GPP) and a de-registration procedure is initiated for a second access type. Thus, embodiments described herein include methods for mitigating ambiguities during "collisions" of various procedures with de-registration requests.

Figure 12:
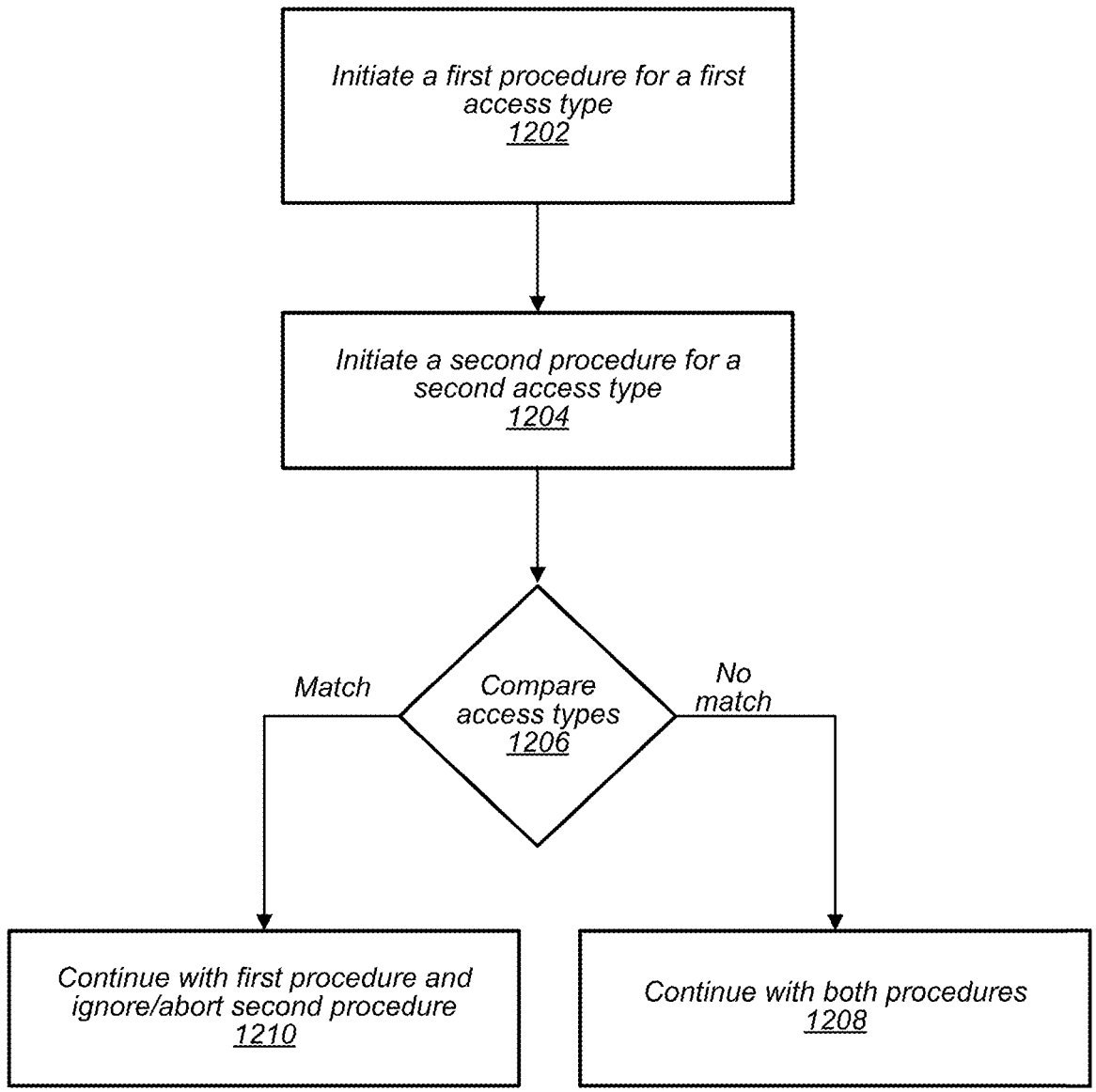
FIG. 12 illustrates a block diagram of an example of a method for determining whether to continue with a first procedure when a second procedure is initiated, according to some embodiments.

For example, FIG. 12 illustrates a block diagram of an example of a method for determining whether to continue with a first procedure when a second procedure is initiated, according to some embodiments. The method shown in FIG. 12 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1202, a first procedure for a first access type may be initiated. In some embodiments, the first procedure may be initiated by a UE, such as UE 106. In some embodiments, the first procedure may be initiated by a network (and/or network entity, such as an AMF or gNB 604). In some embodiments, the first access type may be one of cellular (e.g., 3GPP) or non-cellular (e.g., non-3GPP). In some embodiments, the first procedure may be one of a de-registration procedure initiated by the UE or the network, a registration procedure initiated by the network, a security mode control procedure initiated by the network, and/or an ongoing emergency services session.

At 1204, a second procedure for a second access type may be initiated. In some embodiments, the second procedure may be initiated by the UE (e.g., UE 106). In some embodiments, the second procedure may be initiated by the network (and/or network entity, such as an AMF or gNB 604). In some embodiments, the second access type may be one of cellular (e.g., 3GPP) or non-cellular (e.g., non-3GPP). In some embodiments, the second procedure may be one of a de-registration procedure initiated by the network or the UE, a registration procedure initiated by the UE, a service request initiated by the UE, and/or an ongoing emergency services session.

At 1206, the first access type may be compared to the second access type. In some embodiments, the UE may determine whether the first access type and the second access type are the same (e.g., match). In some embodiments, the network may determine whether the first access type and the second access type are the same (e.g., match).

At 1208, in response to determining that the first and the second access types are not the same, both the first procedure and the second procedure may continue. Alternatively, at 1210, in response to determining that the first and second access types are the same, the first procedure may continue and the second procedure may be ignored and/or aborted.

Below are specific examples of current implementations and applications of the exemplary method of FIG. 12. Note that the applications of the exemplary method of FIG. 12 may be stand-alone applications or may be combined with any or all of the below described applications. Note further that the scenarios and applications described herein are exemplary only and not intended to be limiting, as other applications of the exemplary method of FIG. 12 are within the scope of this disclosure.

In some implementations, there may be a "collision" during a de-registration procedure. In other words, both a UE and a network (or an AMF) may initiate de-registration procedures at substantially the same time. According to 3GPP TS 24.501 Release 15 Section 5.5.2.2.6, "[i]f the UE receives a DEREGISTRATION REQUEST message before the UE-initiated de-registration procedure has been completed," the UE will treat the message according to sub-clause 5.5.2.3.2 (incorporated by reference herein), accept that "[i]f the DEREGISTRATION REQUEST message received by the UE contains de-registration type "re-registration required", and the UE-initiated de-registration procedure is with deregistration type "normal de-registration", the UE need not initiate the registration procedure for initial registration." However, when a UE is registered on both 3GPP and non-3GPP access and the network (or the AMF) transmits a de-registration request with de-registration type set to "re-registration required" for 3GPP access over 3GPP access and, at the same time (e.g., in parallel,) the UE has initiated de-registration for non-3GPP 5G MM over 3GPP access, it is unclear how the UE should respond.

Thus, in some embodiments, the UE may honor (e.g., initiate) the re-registration request for 3GPP access. For example, the standard may be modified to include that "if the access type for UE initiated deregistration is a subset of the access type in the DEREGISTRATION REQUEST received by the UE, the UE need not initiate the registration procedure for initial registration for the access type in the UE initiated deregistration." However, "if the access type for UE initiated deregistration is not a subset of the access type in the DEREGISTRATION REQUEST received by the UE, the UE shall honor the request for re-registration." In other words, in some embodiments, if the access type of the re-registration request is the same as the access type the UE is attempting to de-register, the UE may not be required to initiate the re-registration process. However, in some embodiments, if the access type of the re-registration request is not the same as the access type the UE is attempting to de-register, the UE may be required to initiate the re-registration process.

In some implementations there may be a "collision" during a network initiated de-registration procedure and a UE registration procedure. In other words, the network may initiate a de-registration procedure as the UE is initiating a registration procedure. According to 3GPP TS 24.501 Release 15 Section 5.5.2.2.5, "[i]f the network sent a DEREGISTRATION REQUEST message indicating 're-registration required' in the De-registration type IE and the network receives a REGISTRATION REQUEST message" that indicates either "periodic registration updating" or "mobility registration updating" in a "5GS registration type IE before the network initiated de-registration procedure has been completed, the de-registration procedure shall be progressed." In other words, "the REGISTRATION REQUEST message shall be ignored." However, when a UE is registered on 3GPP and non-3GPP accesses and the network sends a de-registration request with a de-registration type set to "reregistration required" for non-3GPP access over 3GPP access and at the same time in parallel, the UE has initiated a registration request for 3GPP access (e.g., for a periodic registration update), it is unclear how the network should proceed.

Thus, in some embodiments, a network (e.g., gNB 604) may honor and process such a registration request from a UE (such as UE 106) for 3GPP access. For example, the standard may be modified to include that the de-registration message indicates "re-registration required" in the de-registration type IE "as well as indicating the access type to include '3GPP access'". In other words, the network may honor and process the registration request from the UE when the de-registration message and the registration request indicates the same access type.

In some implementations, there may be a "collision" during a network initiated de-registration procedure and a UE initiated service request. In other words, the network may initiate a de-registration procedure as the UE is initiating a service request. According to 3GPP TS 24.501 Release 15 Section 5.6.1.7, "[i]f the UE receives a DEREGISTRATION REQUEST message from the network in state 5GMM-SERVICE-REQUEST-INITIATED, the UE shall progress the DEREGISTRATION REQUEST message and the service request procedure shall be aborted." However, when a UE is registered on both 3GPP and non-3GPP access and the network (or the AMF) transmits a de-registration request for non-3GPP access over 3GPP access and at the same time the UE initiates a service request for pending uplink data over 3GPP access, it is unclear how the service request procedure should proceed.

Thus, in some embodiments, in such a scenario, a service request procedure may proceed over 3GPP access. For example, the standard may be modified to include that "the service request shall only be aborted only if 'Access type' in DEREGISTRATION REQUEST includes the access type over which the Service request message was sent by the lower layers." In other words, the service request may only be aborted when the access type of the service request matches the access type of the de-registration request.

In some implementations, there may be a "collision" during a network initiated registration procedure and a UE initiated de-registration procedure. In other words, the network may initiate a registration procedure as the UE is initiating a de-registration procedure. According to 3GPP TS 24.501 Release 15 Section 5.5.1.2.8, if a de-registration request message is received prior to a registration complete message, the "AMF shall abort the registration procedure for initial registration" and progress the de-registration procedure as described in subclause 5.5.2.2. In addition, the standard notes that "[t]he DEREGISTRATION REQUEST message can be sent by the UE without integrity protection, e.g. if the UE is registered for emergency services and there is no shared 5G NAS security context available, or if due to user interaction a registration procedure is cancelled before the secure exchange of NAS messages has been established." However, where a UE is 5G MM registered over 3GPP access for emergency services and during an ongoing registration procedure for a non-3GPP 5G MM and the UE initiates de-registration request for 3GPP 5G MM over non-3GPP access, it is unclear how the network should proceed.

Thus, in some embodiments, in such a scenario, a network may honor and proceed with the registration procedure for non-3GPP 5G MM. For example, the standard may be modified to include that the AMF may progress the de-registration procedure as described in subclause 5.5.2.2 "only if the access for which REGISTRATION procedure is ongoing is part of the 'Access type' in DEREGISTRATION REQUEST." In other words, the AMF may progress the de-registration procedure only when the access type of the registration procedure matches the access type of the de-registration procedure.

In some implementations, there may be a "collision" during a security mode control procedure and a UE initiated de-registration procedure. In other words, the network may initiate a security mode control procedure as the UE is initiating a de-registration procedure. According to 3GPP TS 24.501 Release 15 Section 5.4.2.7, when there is a "[c]ollision between security mode control procedure and registration, service request or de-registration procedure not indicating switch off" the security mode control procedure should be aborted by the network and the network should "proceed with the UE initiated procedure." However, when a UE is registered on both 3GPP and non-3GPP access and while a security mode procedure is ongoing for 3GPP access, the UE initiates a de-registration request for non-3GPP access over 3GPP access, it is unclear how the network should proceed.

Thus, in some embodiments, in such a scenario, a network may process with the security mode procedure for the 3GPP access. For example, the standard may be modified to include that the de-registration procedure not indicating switch off should be "for the same access type where security mode control procedure is ongoing." In other words, the network may abort the security mode control procedure only when the access type for the security mode control procedure matches the access type for the de-registration request.

In some implementations, there may be a "collision" during a de-registration procedure for one access type when a second access type is supporting an emergency services session. In other words, a user data management (UDM) function for a UE with an active session for emergency services using one access type may initiate a de-registration procedure for a second access type. According to 3GPP TS 24.501 Release 15 Section 5.5.2.1, "[i]f the de-registration procedure is requested by the UDM for a UE that has PDU sessions for emergency services, the AMF shall not send a DEREGISTRATION REQUEST message to the UE." However, when the UE has an active session for emergency services using one access type and initiates a de-registration procedure for a second access type, it is unclear how the network should proceed.

Thus, in some embodiments, in such a scenario, a network may proceed with the de-registration request when the access types are not the same and may ignore the de-registration request from the UDM if the access type are the same. For example, the standard may be modified to include that the AMF may not send a de-registration request message to the UE when "the access-type of the DEREGISTRATION REQUEST is the same as the access type over which the UE has the PDU session for Emergency services." In other words, the AMF may ignore the de-registration request from the UDM when the de-registration request would discontinue the emergency services session.

Example Embodiments

FIGS. 13-16 further illustrate exemplary embodiments of methods for de-registration procedures for a wireless device in a fifth generation (5G) New Radio (NR) network. Note that the methods shown in FIGS. 13-16 may be used in conjunction with any of the systems, methods, or devices shown in the above Figures, among other methods and/or devices, as well as in conjunction with one another.

Figure 13:
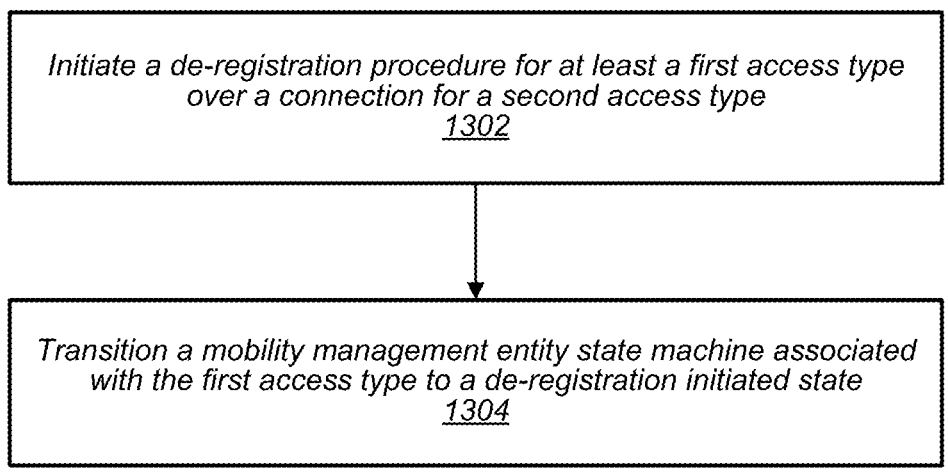
FIG. 13 illustrates a block diagram of an example of a method for a de-registration procedure of one access type over another access type, according to some embodiments.

FIG. 13 illustrates a block diagram of an example of a method for a de-registration procedure of one access type over another access type, according to some embodiments. The method shown in FIG. 13 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1302, a de-registration procedure for (at least) a first access type may be initiated over a connection for a second access type. In some embodiments, the de-registration procedure may be initiated by a UE (or a processor of the UE, e.g., executing program instructions), such as UE 106. In some embodiments, a mobility management (MM) state machine associated with each access type may be maintained, e.g., by the UE. In other words, a first MM state machine associated with the first access type may be maintained and a second MM state machine associated with the second access type may be maintained.

In some embodiments, initiating the de-registration procedure for (at least) the first access type over the connection for the second access type may include initiating a de-registration procedure for the second access type over the connection for the second access type and transitioning the second MM state machine associated with the second access type to a de-registration initiated state. In some embodiments, initiating the de-registration procedure may include transmitting, over the connection for the second access type, a de-registration request message and receiving, over the connection for the second access type, a de-registration accept message. In some embodiments, the de-registration accept message may include an information element indicating de-registration of at least one of the first access type, the second access type, and the first access type and the second access type. In some embodiments, the information element may include eight bits. In some embodiments, the first and second bits of the eight bits may indicate the access type. In some embodiments, a value of the information element of 0000001 may indicate the first access type, a value of the information element of 0000010 may indicate the second access type, and a value of the information element of 00000011 may indicate both the first access type and the second access type.

At 1304, a mobility management entity state machine associated with the first access type may be transitioned to a de-registration initiated state. In some embodiments, a current state of the second MM state machine may be maintained as part of the de-registration procedure. In other words, the current state of the second MM state machine may not be changed (transitioned) as part of the de-registration procedure.

In some embodiments, the first access type may be one of cellular communications and non-cellular communications. In some embodiments, the first access type may be according to a cellular communication protocol, such LTE or 5G NR and the second access type may be according a non-cellular communication protocol, such as Wi-Fi. In some embodiments, the second access type may be according to a cellular communication protocol, such LTE or 5G NR and the first access type may be according a non-cellular communication protocol, such as Wi-Fi.

Figure 14:
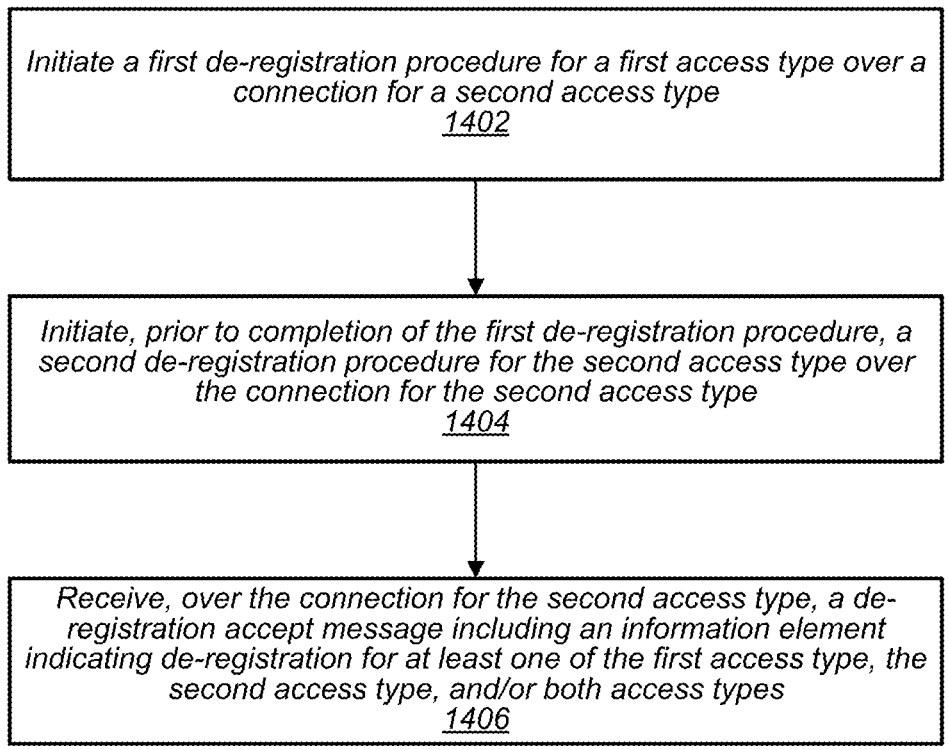
FIG. 14 illustrates a block diagram of another example of a method for a de-registration procedure of one access type over another access type, according to some embodiments.

FIG. 14 illustrates a block diagram of another example of a method for a de-registration procedure of one access type over another access type, according to some embodiments. The method shown in FIG. 14 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1402, a first de-registration procedure for a first access type may be initiated over a connection for a second access type. In some embodiments, the first de-registration procedure may be initiated by a UE (or a processor of the UE, e.g., executing program instructions), such as UE 106. In some embodiments, the UE may be connected to a network via the first access type and the second access type.

At 1404, a second de-registration procedure for the second access type may be initiated over the connection for the second access type prior to completion of the first de-registration procedure. In other words, during the first de-registration procedure for the first access type, the second de-registration procedure for the second access type may be initiated.

At 1406, a de-registration accept message may be received over the connection for the second access type. In some embodiments, the de-registration accept message may include an information element that may indicate de-registration for (at least) one of the first access type, the second access type, and/or both the first access type and the second access type. In some embodiments, the information element may include eight bits. In some embodiments, the first and second bits of the eight bits may indicate the access type. In some embodiments, a value of the information element of 0000001 may indicate the first access type, a value of the information element of 0000010 may indicate the second access type, and a value of the information element of 00000011 may indicate both the first access type and the second access type.

In some embodiments, the first access type may be one of cellular communications and non-cellular communications. In some embodiments, the first access type may be according to a cellular communication protocol, such LTE or 5G NR and the second access type may be according a non-cellular communication protocol, such as Wi-Fi. In some embodiments, the second access type may be according to a cellular communication protocol, such LTE or 5G NR and the first access type may be according a non-cellular communication protocol, such as Wi-Fi.

Figure 15:
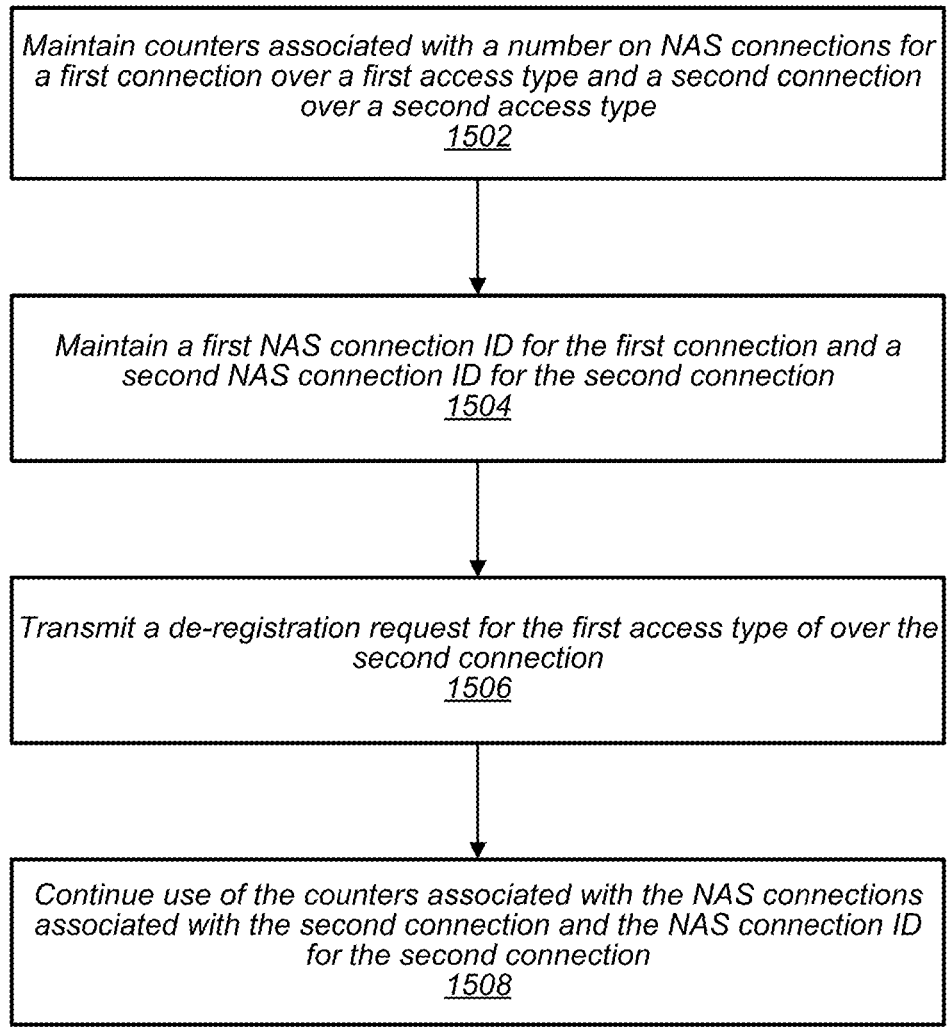
FIG. 15 illustrates a block diagram of an example of a method for maintaining NAS connection IDs during a de-registration procedure of one access type over another access type, according to some embodiments.

FIG. 15 illustrates a block diagram of an example of a method for maintaining NAS connection IDs during a de-registration procedure of one access type over another access type, according to some embodiments. The method shown in FIG. 15 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1502, counters associated with a number on non-access stratum (NAS) connections for a first connection over a first access type and a second connection over a second access type may be maintained. In some embodiments, the counters may be maintained by a UE (or a processor of the UE, e.g., executing program instructions), such as UE 106. In some embodiments, the UE may be connected to a network via the first access type and the second access type.

At 1504, a first NAS connection ID for the first connection and a second NAS connection ID for may be maintained.

At 1506, a de-registration request for the first access type may be transmitted over the second connection.

At 1508, counters associated with the NAS connections associated with the second connection and the NAS connection ID for the second connection may continue to be used. In other words, when a de-registration request for the first access type is transmitted over the second access type, a UE/AMF/NW may continue to use a NAS counter and a NAS connection ID corresponding to (or associated with) the second access type. Thus, the UE/AMF/NW may continue to use a NAS counter and a NAS connection ID associated with an access type used for transmission of the de-registration request In some embodiments, the first access type may be one of cellular communications and non-cellular communications. In some embodiments, the first access type may be according to a cellular communication protocol, such LTE or 5G NR and the second access type may be according a non-cellular communication protocol, such as Wi-Fi. In some embodiments, the second access type may be according to a cellular communication protocol, such LTE or 5G NR and the first access type may be according a non-cellular communication protocol, such as Wi-Fi.

Figure 16:
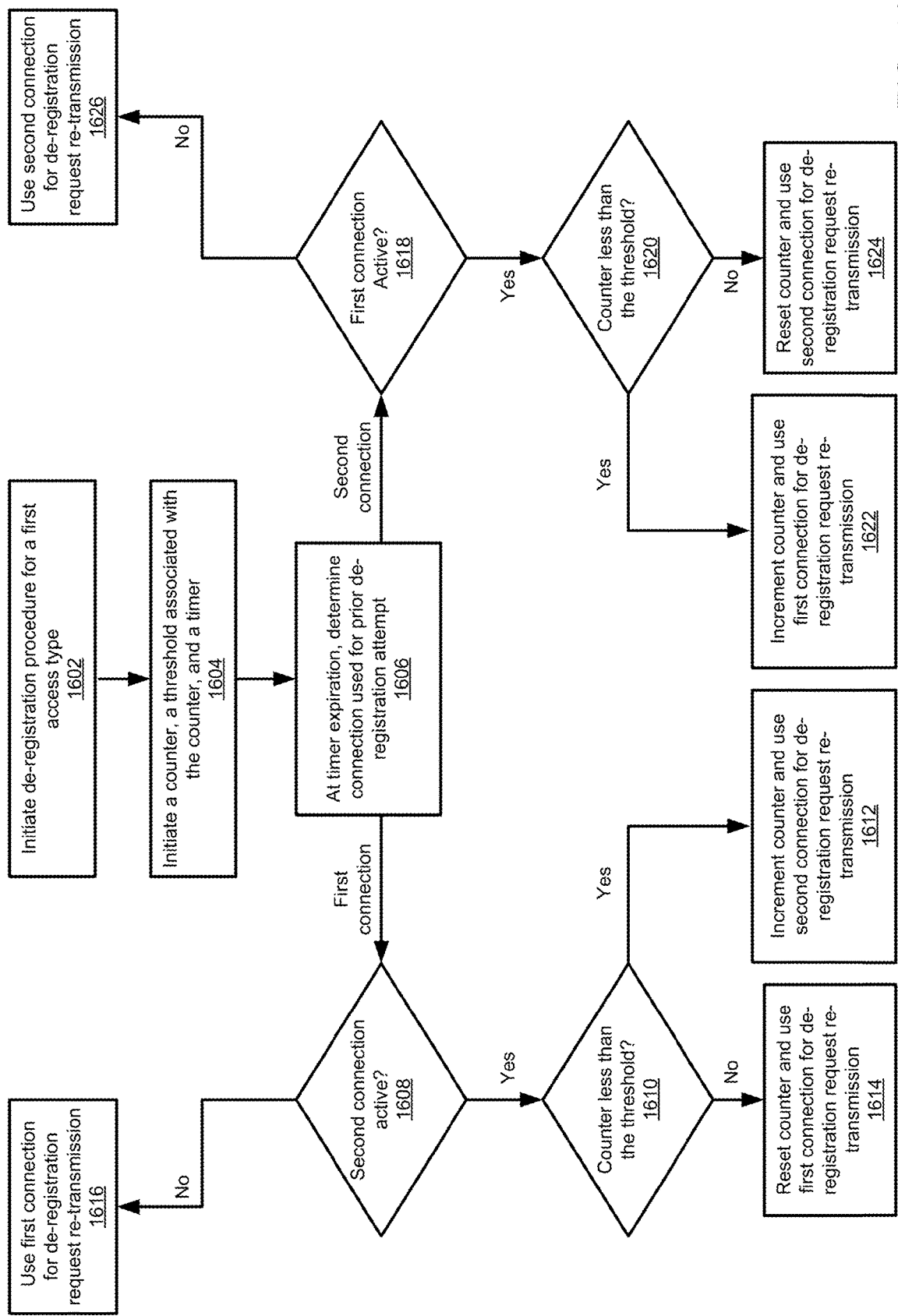
FIG. 16 illustrates a block diagram of an example of a method for determining an access type to use for a de-registration procedure, according to some embodiments.

FIG. 16 illustrates a block diagram of an example of a method for determining an access type to use for a de-registration procedure, according to some embodiments. The method shown in FIG. 16 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1602, a de-registration procedure for a first access type may be initiated. In some embodiments, the counters may be maintained by a UE (or a processor of the UE, e.g., executing program instructions), such as UE 106. In some embodiments, the UE may be connected to a network over a first connection corresponding to (or associated with) a first access type and a second connection corresponding to (or associated with) a second access type.

At 1604, a counter, a threshold associated with (or corresponding to) the counter, and a timer may be initiated.

At 1606, upon (or at) expiration of the timer, a type of connection used for a prior de-registration attempt may be determined. In other words, upon (or at) expiration of the timer, whether the first connection or the second connection was used for a prior de-registration attempt.

At 1608, upon determining that the first connection was used for the prior-deregistration attempt, it may be determined whether the second connection is active. In some embodiments, if the second connection is not active, the first connection may be used for a de-registration request re-transmission at 1616. Alternatively, if the second connection is active, it may be determined whether the counter in less than the threshold at 1610.

At 1614, if the counter in not less than the threshold, the counter may be reset and the first connection may be used for a de-registration request re-transmission. Alternatively, if the counter is less than the threshold, the counter may be incremented and the second connection may be used a de-registration request re-transmission at 1612.

At 1618, upon determining that the second connection was used for the prior-deregistration attempt, it may be determined whether the first connection is active. In some embodiments, if the first connection is not active, the second connection may be used for a de-registration request re-transmission at 1626. Alternatively, if the first connection is active, it may be determined whether the counter in less than the threshold at 1620.

At 1624, if the counter in not less than the threshold, the counter may be reset and the second connection may be used for a de-registration request re-transmission. Alternatively, if the counter is less than the threshold, the counter may be incremented and the first connection may be used a de-registration request re-transmission at 1622.

In some embodiments, the first access type may be one of cellular communications and non-cellular communications. In some embodiments, the first access type may be according to a cellular communication protocol, such LTE or 5G NR and the second access type may be according a non-cellular communication protocol, such as Wi-Fi. In some embodiments, the second access type may be according to a cellular communication protocol, such LTE or 5G NR and the first access type may be according a non-cellular communication protocol, such as Wi-Fi.

Further Embodiments

In some embodiments, a method for a de-registration procedure for a wireless device, such as UE 106, in a fifth generation (5G) New Radio (NR) network may include initiating a de-registration procedure for at least the first access type over a connection for the second access type; and transitioning a first mobility management (MM) state machine associated with the first access type to a de-registration initiated state.

In some embodiments, the method may further include maintaining a current state of a second MM state machine associated with the second access type.

In some embodiments, the method may further include initiating the de-registration procedure for at least the first access type over the connection for the second access type further comprises initiating a de-registration procedure for the second access type over the connection for the second access type; and wherein the method may further include transitioning a second MM state machine associated with the second access type to a de-registration initiated state.

In some embodiments, the first access type may be one of cellular communications and non-cellular communications and the second access type may be one of cellular communications and non-cellular communications. In other embodiments, the first access type may be according to a cellular communication protocol, and the second access type may be according to a non-cellular communication protocol. In some embodiments, the first access type maybe according to a non-cellular communication protocol and the second access type may be according to a cellular communication protocol. In some embodiments, the cellular communication protocol may be fifth generation (5G) new radio (NR). In some embodiments, the non-cellular communications protocol may be Wi-Fi.

In some embodiments, initiating the de-registration procedure may further include transmitting, over the connection for the second access type, a de-registration request message and receiving, over the connection for the second access type, a de-registration accept message, wherein the de-registration accept message may include an information element indicating de-registration of at least one of the first access type, the second access type, and the first access type and the second access type. In some embodiments, the information element may include eight bits, wherein first and second bits of the eight bits indicate the access type. In some embodiments, a value of the information element of 0000001 may indicate the first access type, a value of the information element of 0000010 may indicate the second access type, and a value of the information element of 00000011 may indicate both the first access type and the second access type.

In some embodiments, a device including at least one antenna, at least one radio coupled to the at least one antenna, and a processing element coupled to the at least one radio may be configured to implement the method. In some embodiments, a (non-transitory) memory medium may include program instructions that, when executed, cause implementation of the method. In some embodiments, an apparatus may include a memory and at least one processor in communication with the memory and may be configured to implement the method.

In some embodiments, a method for a de-registration procedure for a wireless device, such as UE 106, in a fifth generation (5G) New Radio (NR) network may include initiating a first de-registration procedure for a first access type over a connection for the second access type; initiating, prior to completion of the first de-registration procedure, a second de-registration procedure for a second access type over the connection for the second access type; and receiving, from a network entity over the connection for the second access type, a de-registration accept message, wherein the de-registration accept message comprises an information element indicating de-registration of at least one of the first access type, the second access type, and the first access type and the second access type.

In some embodiments, the information element may include eight bits, wherein first and second bits of the eight bits indicate the access type. In some embodiments, a value of the information element of 0000001 may indicate the first access type, a value of the information element of 0000010 may indicate the second access type, and a value of the information element of 00000011 may indicate both the first access type and the second access type.

In some embodiments, the first access type may be one of cellular communications and non-cellular communications and the second access type may be one of cellular communications and non-cellular communications. In other embodiments, the first access type may be according to a cellular communication protocol, and the second access type may be according to a non-cellular communication protocol. In some embodiments, the first access type maybe according to a non-cellular communication protocol and the second access type may be according to a cellular communication protocol. In some embodiments, the cellular communication protocol may be fifth generation (5G) new radio (NR). In some embodiments, the non-cellular communications protocol may be Wi-Fi.

In some embodiments, a device including at least one antenna, at least one radio coupled to the at least one antenna, and a processing element coupled to the at least one radio may be configured to implement the method. In some embodiments, a (non-transitory) memory medium may include program instructions that, when executed, cause implementation of the method. In some embodiments, an apparatus may include a memory and at least one processor in communication with the memory and may be configured to implement the method.

In some embodiments, a method for a de-registration procedure for a wireless device, such as UE 106, in a fifth generation (5G) New Radio (NR) network may include maintaining one or more counters associated with a number of non-access stratum (NAS) connections for each of a first connection over the first access type and a second connection over the second access type; maintaining a first NAS connection identifier for the first connection and a second NAS connection identifier for the second connection; transmitting a de-registration request for a first access type over the second connection; and continuing use of counters associated with NAS connections associated with the second connection and the NAS connection identifier for the second connection.

In some embodiments, the first access type may be one of cellular communications and non-cellular communications and the second access type may be one of cellular communications and non-cellular communications. In other embodiments, the first access type may be according to a cellular communication protocol, and the second access type may be according to a non-cellular communication protocol. In some embodiments, the first access type maybe according to a non-cellular communication protocol and the second access type may be according to a cellular communication protocol. In some embodiments, the cellular communication protocol may be fifth generation (5G) new radio (NR). In some embodiments, the non-cellular communications protocol may be Wi-Fi.

In some embodiments, a device including at least one antenna, at least one radio coupled to the at least one antenna, and a processing element coupled to the at least one radio may be configured to implement the method. In some embodiments, a (non-transitory) memory medium may include program instructions that, when executed, cause implementation of the method. In some embodiments, an apparatus may include a memory and at least one processor in communication with the memory and may be configured to implement the method.

In some embodiments, a method for a de-registration procedure for a wireless device, such as UE 106, in a fifth generation (5G) New Radio (NR) network may include in response to initiating a de-registration procedure for a first access type, initiating a first counter, a first threshold associated with the first counter, and a timer associated with completion of the de-registration procedure; upon expiration of the timer, determining whether a prior de-registration request message associated with the de-registration procedure was transmitted over a first connection associated with the first access type or a second connection associated with a second access type; in response to determining that the prior de-registration request message was transmitted over the first connection, determining whether the second connection is active; in response to determining that the second connection is active, comparing the first counter to the first threshold; and in response to determining that the first counter is less than the first threshold incrementing the first counter; and transmitting a de-registration request re-transmission over the second connection.

In some embodiments, the method may further include, in response to determining that the first counter is greater than or equal to the first threshold resetting the first counter; and transmitting the de-registration request re-transmission over a connection use to initiate the de-registration procedure.

In some embodiments, the method may further include, in response to determining that the second connection is not active, transmitting the de-registration request re-transmission over the first connection.

In some embodiments, the method may further include in response to determining that the prior de-registration request message was transmitted over the second connection, determining whether the first connection is active; in response to determining that the first connection is active, comparing the first counter to the first threshold; and in response to determining that the first counter is less than the first threshold incrementing the first counter; and transmitting the de-registration request re-transmission over the first connection.

In some embodiments, the method may further include, in response to determining that the first counter is greater than or equal to the first threshold resetting the first counter; and transmitting the de-registration request re-transmission over the connection use to initiate the de-registration procedure.

In some embodiments, the method may further include, in response to determining that the first connection is not active, transmitting the de-registration request re-transmission over the second connection.

In some embodiments, the first access type may be one of cellular communications and non-cellular communications and the second access type may be one of cellular communications and non-cellular communications. In other embodiments, the first access type may be according to a cellular communication protocol, and the second access type may be according to a non-cellular communication protocol. In some embodiments, the first access type maybe according to a non-cellular communication protocol and the second access type may be according to a cellular communication protocol. In some embodiments, the cellular communication protocol may be fifth generation (5G) new radio (NR). In some embodiments, the non-cellular communications protocol may be Wi-Fi.

In some embodiments, a device including at least one antenna, at least one radio coupled to the at least one antenna, and a processing element coupled to the at least one radio may be configured to implement the method. In some embodiments, a (non-transitory) memory medium may include program instructions that, when executed, cause implementation of the method. In some embodiments, an apparatus may include a memory and at least one processor in communication with the memory and may be configured to implement the method.

In some embodiments, a method for a de-registration procedure for a wireless device, such as UE 106, in a fifth generation (5G) New Radio (NR) network may include initiating a first procedure for the first access type; initiating, during the first procedure, a second procedure for a second access type; comparing the first access type to the second access type; and in response to determining that the first access type and the second access type differ, continuing both the first procedure and the second procedure.

In some embodiments, the method may further include, in response to determining that the first access type and the second access type do not differ, continuing the first procedure and ignoring and/or aborting the second procedure.

In some embodiments, the first access type may be one of cellular communications and non-cellular communications and the second access type may be one of cellular communications and non-cellular communications. In other embodiments, the first access type may be according to a cellular communication protocol, and the second access type may be according to a non-cellular communication protocol. In some embodiments, the first access type maybe according to a non-cellular communication protocol and the second access type may be according to a cellular communication protocol. In some embodiments, the cellular communication protocol may be fifth generation (5G) new radio (NR). In some embodiments, the non-cellular communications protocol may be Wi-Fi.

In some embodiments, a device including at least one antenna, at least one radio coupled to the at least one antenna, and a processing element coupled to the at least one radio may be configured to implement the method. In some embodiments, a (non-transitory) memory medium may include program instructions that, when executed, cause implementation of the method. In some embodiments, an apparatus may include a memory and at least one processor in communication with the memory and may be configured to implement the method.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna;
   a first radio, wherein the first radio is configured to perform wireless communication according to a first access type;
   a second radio, wherein the second radio is configured to perform wireless communication according to a second access type;
   one or more processors coupled to the first and second radios, wherein the one or more processors and the first and second radios are configured to perform voice and/or data communications;
   wherein the one or more processors are configured to cause the UE to:
      when the UE receives, from a network, a DEREGISTRATION REQUEST message while in a 5GMM-SERVICE-REQUEST-INITIATED state, progress the DEREGISTRATION REQUEST message; and when an access type in the DEREGISTRATION REQUEST includes the access type over which a service request message is attempted, abort a service request procedure associated with the service request.

2. The UE of claim 1,
wherein, when the access type in the DEREGISTRATION REQUEST does not include the access type over which a service request message is attempted, the one or more processors are further configured to cause the UE to progress the service request procedure associated with the service request.

3. The UE of claim 1,
wherein the access type includes at least one of:
 a first access type according to a cellular communication protocol; and
 a second access type according to a non-cellular communication protocol.

4. The UE of claim 3,
wherein the cellular communication protocol is fifth generation (5G) new radio (NR), and wherein the non-cellular communication protocol is Wi-Fi.

5. The UE of claim 1,
wherein the one or more processors are further configured to cause the UE to:
 maintain one or more counters associated with a number of non-access stratum (NAS) connections for each of a first connection and a second connection, wherein the first connection is associated with a first access type, and wherein the second connection is associated with a second access type;
 maintaining a first NAS connection identifier for the first connection and a second NAS connection identifier for the second connection; and
 upon initiating a de-registration request for at least the first access type, continue use of counters associated with NAS connections associated with the second connection and the NAS connection identifier for the second connection.

6. The UE of claim 1,
wherein the one or more processors are further configured to cause the UE to:
 in response to initiating a de-registration procedure for a first access type, initiating a first counter, a first threshold associated with the first counter, and a timer associated with completion of the de-registration procedure for the first access type;
 upon expiration of the timer, determining whether a prior de-registration request message associated with the de-registration procedure was transmitted over a first connection associated with the first access type or a second connection associated with a second access type; and
 in response to determining that the prior de-registration request message was transmitted over the first connection, determine whether the second connection is active.

7. The UE of claim 6;
wherein, when the second connection is active, the one or more processors are further configured to cause the UE to:
 compare the first counter to the first threshold, wherein, when the first counter is less than the first threshold, the one or more processors are further configured to cause the UE to increment the first counter and transmit a de-registration request re-transmission over the second connection, and wherein, when the first counter is greater than or equal to the first threshold, the one or more processors are further configured to cause the UE to reset the first counter and transmit the de-registration request re-transmission over a connection used to initiate the de-registration procedure; and
wherein, when the second connection is not active, the one or more processors are further configured to cause the UE to transmit the de-registration request re-transmission over the first connection.

8. The UE of claim 7,
wherein the one or more processors are further configured to cause the UE to:
 in response to determining that the prior de-registration request message was transmitted over the second connection, determine whether the first connection is active;
wherein, when the first connection is active, the one or more processors are further configured to cause the UE to:
 compare the first counter to the first threshold, wherein when the first counter is less than the first threshold the one or more processors are further configured to cause the UE to increment the first counter and transmit the de-registration request re-transmission over the first connection, and wherein when the first counter is greater than or equal to the first threshold, the one or more processors are further configured to cause the UE to reset the first counter and transmit the de-registration request re-transmission over the connection used to initiate the de-registration procedure; and
wherein, when the first connection is not active, the one or more processors are further configured to cause the UE to transmit the de-registration request re-transmission over the second connection.

9. A network node, comprising:
one or more processors, wherein the one or more processors are configured to cause the network node to:
 send, to a user equipment device (UE), a DEREGISTRATION REQUEST message to initiate a de-registration procedure;
 receive, from the UE, a REGISTRATION REQUEST message indicating either mobility registration updating or periodic registration updating in a 5GS registration type information element (IE) before the de-registration procedure has been completed; and
 determine whether the REGISTRATION REQUEST is processed or ignored based on an access type in the DEREGISTRATION REQUEST message.

10. The network node of claim 9,
wherein the one or more processors are further configured to cause the network node determine to progress the de-registration procedure.

11. The network node of claim 9,
wherein the DEREGISTRATION REQUEST message includes an indication of a first access type, and wherein the REGISTRATION REQUEST message includes an indication of a second access type.

12. The network node of claim 11,
wherein, when the first access type and the second access type are the same access type, the REGISTRATION REQUEST is processed.

13. The network node of claim 11,
wherein, when the first access type and the second access type are different access types, the REGISTRATION REQUEST is ignored.

14. The network node of claim 9,
wherein the access type includes at least one of:
- a first access type according to a cellular communication protocol; and
- a second access type according to a non-cellular communication protocol.

15. The network node of claim 14,
wherein the cellular communication protocol is fifth generation (5G) new radio (NR), and wherein the non-cellular communication protocol is Wi-Fi.

16. A apparatus, comprising:
a memory; and
a processor in communication with the memory, wherein the processor is configured to:
- upon receipt, from a network, of a DEREGISTRATION REQUEST message while in a 5GMM-SERVICE-REQUEST-INITIATED state, progress the DEREGISTRATION REQUEST message; and
- when an access type in the DEREGISTRATION REQUEST includes the access type over which a service request message is attempted, abort a service request procedure associated with the service request.

17. The apparatus of claim 16,
wherein, when the access type in the DEREGISTRATION REQUEST does not include the access type over which a service request message is attempted, the processor is further configured to progress the service request procedure associated with the service request.

18. The apparatus of claim 16,
wherein the access type includes at least one of:
- a first access type according to a cellular communication protocol; and
- a second access type according to a non-cellular communication protocol.

19. The apparatus of claim 18,
wherein the cellular communication protocol is fifth generation (5G) new radio (NR), and wherein the non-cellular communication protocol is Wi-Fi.

20. The apparatus of claim 18
wherein the processor is further configured to:
- maintain one or more counters associated with a number of non-access stratum (NAS) connections for each of a first connection and a second connection, wherein the first connection is associated with a first access type, and wherein the second connection is associated with a second access type;
- maintaining a first NAS connection identifier for the first connection and a second NAS connection identifier for the second connection; and
- upon initiating a de-registration request for at least the first access type, continue use of counters associated with NAS connections associated with the second connection and the NAS connection identifier for the second connection.

* * * * *